United States Patent Office 2,735,302
Patented Feb. 21, 1956

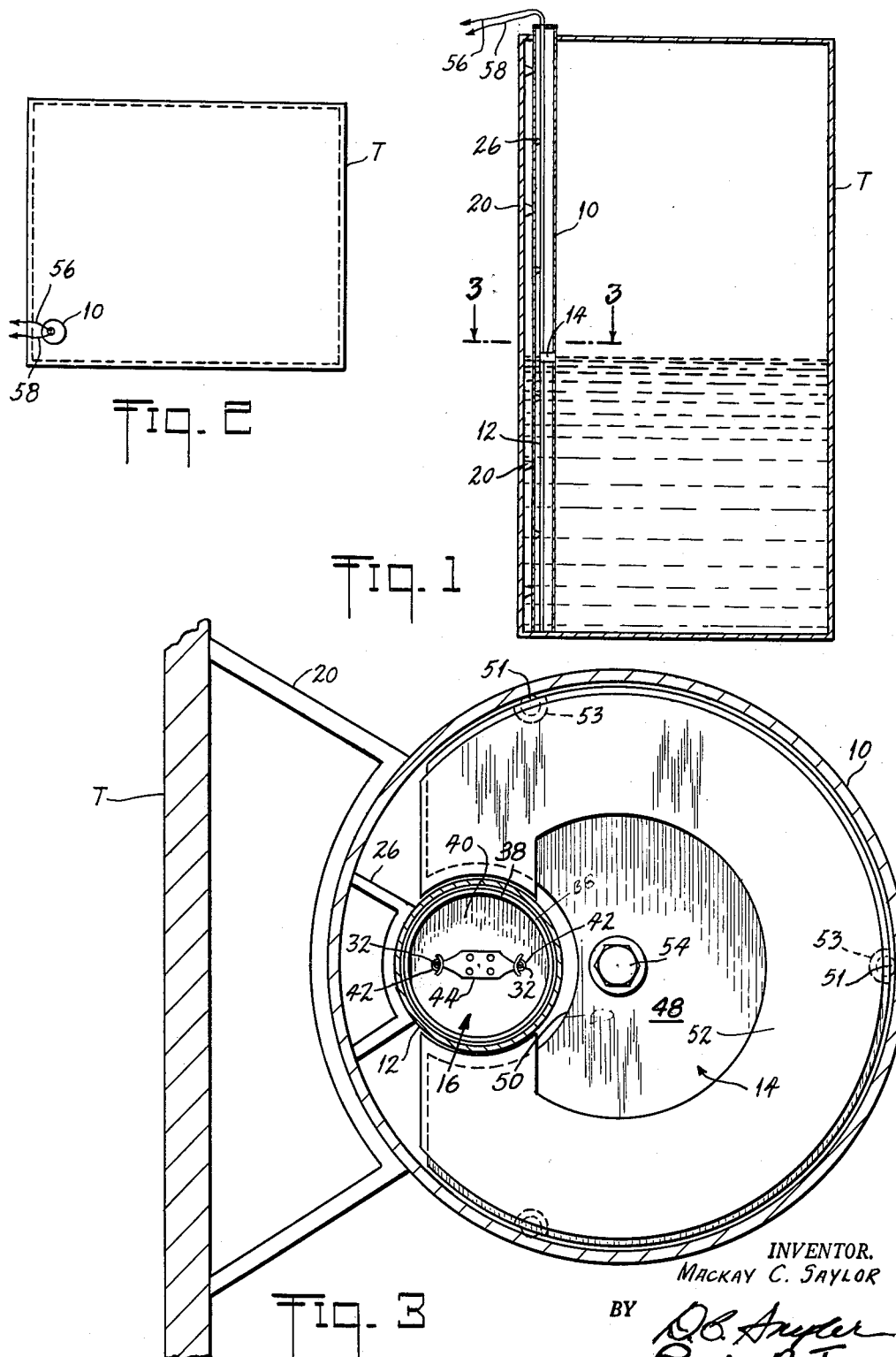

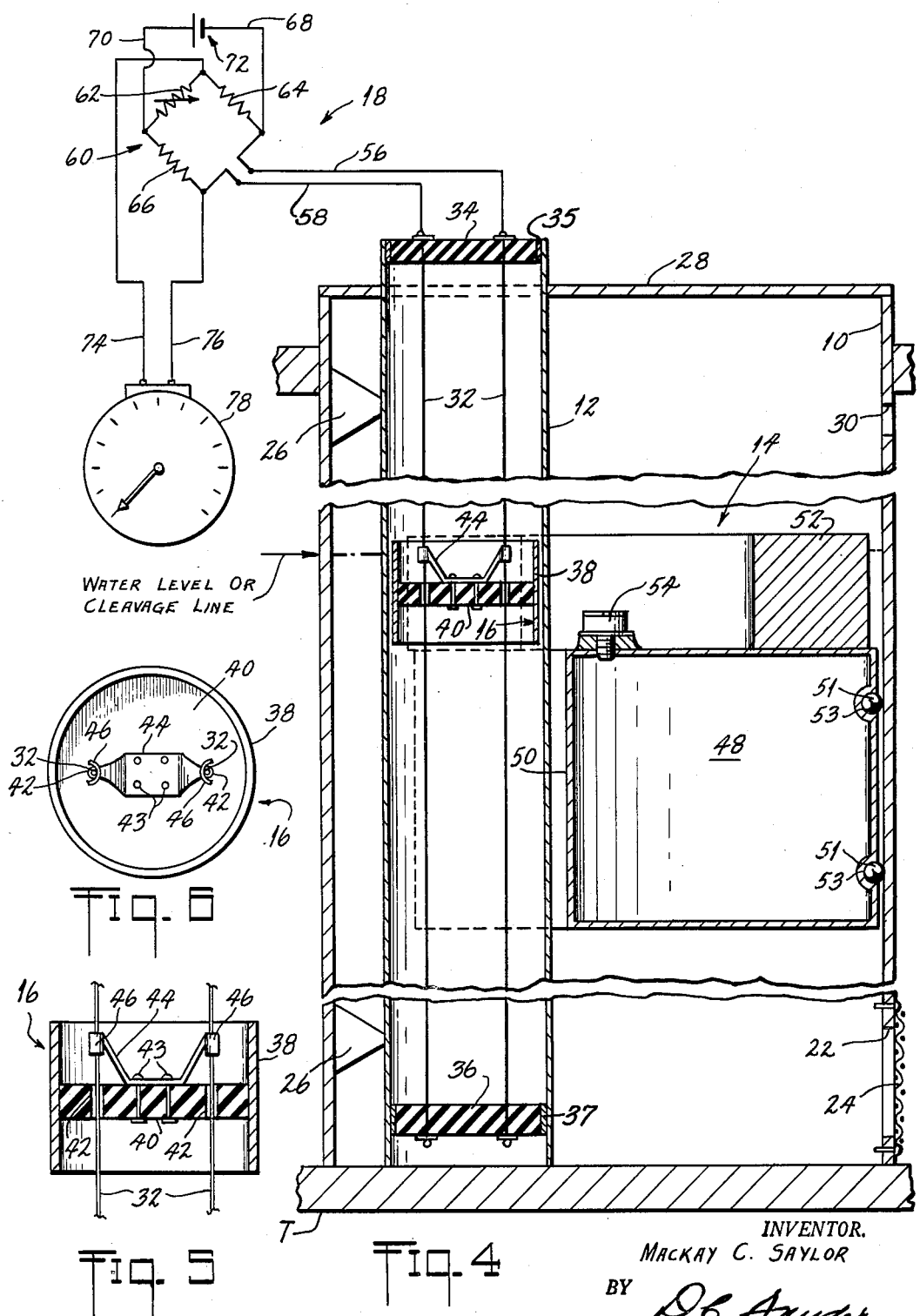

2,735,302

LIQUID LEVEL INDICATOR

Mackay C. Saylor, Montclair, N. J.

Application August 7, 1952, Serial No. 303,199

4 Claims. (Cl. 73—313)

(Granted under Title 35, U. S. Code (1952), sec. 266)

The invention described herein may be manufactured and used by or for the Government of the United States of America for governmental purposes without the payment of any royalties thereon or therefor.

This invention relates to liquid-level indicators and is directed particularly to improved apparatus for indicating the level of a liquid in a container such as an oil or gasoline tank or the like.

Apparatus of the invention comprises an electrical instrument extending vertically of the container throughout the depth of the liquid that is desired to be determined. More specifically, the electrical instrument comprises a pair of resistance wires that extend side by side and preferably parallel to each other in a vertical direction, and for a distance that encompasses the depth of liquid to be determined. A bus bar or short-circuiting member is movable along the pair of resistance wires and in electrical contact therewith, to vary the resistance of the circuit. A suitable instrument for electrical measurement is provided in the circuit of the resistance wires, and determines resistance variations in the resistance circuit that indicate and locate the position of the bus bar along the resistance wires.

A device operates the electrical instrument by actuating the bus bar along the resistance wires, and this embodies a float which carries a magnet, and travels up and down to positions that correspond with the depth of the liquid in the container. An armature secured to the bus bar of the electrical instrument is attracted to the magnet, and thus travels with the magnet to accomplish movement of the bus bar.

The electrical instrument is housed in a fluid-tight tube, which extends throughout the length of the electrical instrument in the container. The tube is made of any suitable non-magnetic material.

The float is contained in liquid within the container, and with the magnet is disposed exteriorly of the housing tube. A guide for travel of the float in response to depth changes of the liquid in the container holds the magnet appropriately positioned with reference to its armature to maintain the force of magnetic attraction uniform during operation of the electrical instrument.

The guide comprises guideways that hold the magnet and float out of physical contact with the housing tube at all times during movement of the float, and thereby inhibits frictional resistance that would render depth measurements by the electrical instrument inaccurate. The guideways also hold the magnetic poles located a uniform distance away from the tube during travel of the float along the tube, and this inhibits variations in magnetic force that could result from spacing variations between the poles of the magnet and its armature.

A convenient structure for the guide is a tube inside the container, which is axially parallel with and exteriorly of the housing tube, and in which the float and magnet are confined to travel along the housing tube. The float is provided with bearings, constituting sets of rollers that bear on the inside surface of the guide tube with anti-frictional contact. The bearings are spaced apart circumferentially with reference to the guide tube and with reference to the float, to locate at least three bearing guideways of the guide tube arranged to span more than half the circle thereof. Thus, the several bearings of the respective sets of rollers oppose each other radially and through the body of the float to confine movement of the float in a path that maintains the magnetic poles uniformly spaced with reference to the armature during movement of the float along the housing tube.

Accordingly, it is one object of this invention to provide an improved liquid level indicator for use either in open tanks or closed tanks whether or not under pressure.

It is another object to provide a device of the character described that can be used for measuring the level of the cleavage plane between two non-miscible liquids.

It is a further object to provide a device of the character described which is protected from the destructive action of a turbulent liquid and which at the same time will accurately measure the liquid level.

It is a further object to provide a device of the above nature that is adaptable for remotely indicating or recording of liquid level, or for actuating signalling devices or pumps.

A practical embodiment of the present invention is disclosed in the accompanying drawings, in which Fig. 1 is a cross-sectional elevation of a liquid container equiped with apparatus embodying the present invention, Fig. 2 is a plan of the container shown in Fig. 1, Fig. 3 is an enlarged, cross-sectional plan, taken along the line 3—3 of Fig. 1, Fig. 4 is a cross-sectional elevation through the longitudinal centerplane of the apparatus of the invention, and including a wiring diagram schematically of electrical components of the apparatus, Fig. 5 is a elevation, similar to Fig. 4, showing a detail thereof enlarged, and Fig. 6 is a plan of the details of Fig. 5.

In the drawings, wherein like reference characters denote corresponding parts throughout the several views; the letter "T" designates a container of liquid constituting a storage tank, within which the liquid level indicating apparatus embodying the invention is installed, which comprises an electrical instrument housed in the tube 12, Figs. 1 and 4, and in circuit with suitable electrical measuring apparatus indicated generally at 18.

The electrical instrument housed in tube 12 comprises a pair of resistance wires 32, Fig. 4, which extend vertically in container "T" throughout a distance corresponding with the depth to be determined of liquid in the container. Tube 12 is fluid tight. It rests on the bottom of container "T," and extends vertically upwardly therefrom beyond the top of the container. Near the bottom, a disc 36 of insulating material is secured inside the tube 12, and is sealed fluid-tight by band 37, which prevents liquid of container "T" from entering tube 12. Similar disc 34 is secured inside the tube 12 at the top and also is sealed by band 35. Resistance wires 32 are secured to the insulators 34 and 36, and are drawn taut between them, to be positioned vertically and parallel to each other inside the tube 12, where they are out of contact with the liquid in container "T."

The sealing bands of discs 34 and 36, in addition to keeping liquid of container "T" out of tube 12, also close the tube from the ambient atmosphere, which may contain substances that could attack the resistance wires 32 chemically and by oxidation or otherwise change the electrical properties of resistance wire and other components of the electrical instrument within the tube. Preferably, tube 12 is filled with a chemically inert gas, such as nitrogen.

Bus bar or short-circuiting member 44 spans the gap between resistance wires 32, and comprises the concave shoes or brushes 46 which bear against the resistance wires and maintain electrical contacting engagement therewith as the bus bar is moved along the wires.

Bus bar 44 is secured to the insulating block 40 by means of rivets 43, Figs. 5 and 6. Apertures 42 in insulator 40 are in aligned registry each with a shoe 46, and each wire 32 travels through an aperture 42 without contacting block 40. Insulating block 40 carries the armature 38, which is cylindrical, and is suspended inside housing tube 12 concentrically therewith. Bar bar 44 and armature 38, secured to each other by means of insulation 40, constitute a traveller or armature member 16, which travels along tube 12 lengthwise thereof, with bus bar 44 travelling along resistance wires 32 and varying the length of resistance wire in the circuit of measuring apparatus 18.

A float, indicated generally at 14, comprises the fluid confining chamber 48, of non-magnetic material such as brass, and an actuator for traveller 16 constituting the magnet 52 secured to chamber 48 on top. Float 14 moves up and down in container "T" following the level of liquid contained therein which, for example, may be a liquid fuel that is suitable for operating in engine. Container "T" also may contain another liquid which is supplied thereto to keep the container full as the fuel is consumed, the added liquid being water, or the like, that is heavier than liquid hydrocarbon fuel and not miscible therewith. Thus, there is water below, and a lighter liquid above which is separated from the water at the water level or cleavage line indicated by the arrow in Fig. 4. Float 14 follows the cleavage line up or down in accordance with the quantities of the respective several liquids in container "T."

Plug 54 of fluid chamber 48 may be removed to supply chamber 48 with a predetermined quantity of oil, water or the like ballast, to control the weight of the float 14, and thereby control the vertical position of the float and the magnet 52, with reference water level or cleavage line. This provides an adjustment for locating and setting the traveller of armature 38 and bus bar 44 with reference to the cleavage line.

Magnet 52 is a horseshoe type of permanent magnet, and housing tube 12 is made of a suitable non-magnetic material, such as brass. The chamber 48 of float 14 is recessed at 50, as seen most clearly in Fig. 3, to extend around the housing tube 12. A guide is provided for travel of float 14 up and down along tube 12 according to the depth of liquid in container "T," and in the embodiment of the disclosure the outer tube 10 constitutes a suitable guide.

The outer guide tube 10 preferably is formed of a non-magnetic material such as brass, and is vertically supported against the inside of the tank T as by a plurality of metallic stay members 20 brazed or otherwise securely fixed between the tank "T" and the tube 12. See Figs. 1 and 3. The lower end of guide tube 10 is seated against the floor of container "T" and a side opening 22, Fig. 4, positioned slightly above the bottom of the container, permits the liquid therein at the level of opening 22 to flow freely into and out of tube 10. The side opening 22 is preferably fitted with a screen 24 to prevent passage of foreign matter into the guide tube 10.

In the case of a closed container "T" as is illustrated, the upper end of guide tube 10 preferably extends through an opening in the top of the container, within which opening it is circumferentially welded to seal the container, and to hold the guide tube rigidly in position in the tank "T."

Housing tube 12 is held in vertical position in container "T" by being secured inside guide tube 10 by means of stay members 26, Figs. 3 and 4, which holds the tube 12 eccentrically in tube 10, but axially parallel. The lower end of housing tube 12 is seated against the bottom of the tank "T" and its upper end projects through an opening in a top cover member 28 that closes the upper end of guide tube 10. Housing tube 12 is circumferentially welded against the cover member 28 to provide additional rigidity thereof with respect to outer guide tube 10.

Opening 30 is provided in the wall of guide tube 10 near the top of container "T" to allow liquid at that level to flow freely into or out of the guide tube. By means of the openings 22 and 30, the cleavage line within tube 10 always is at the same level as in container "T."

Float 14, and the fluid confining chamber 48 thereof, is slightly smaller in diameter than the inside diameter of the outer guide tube 10, in which it fits loosely and moves freely in the vertical direction of guide tube 10. Float 14 in guide tube 10 locates circular recess 50 coaxially aligned with respect to the inner guide tube 12. A plurality of balls 51, seated in hemispherical concavities 53 in the cylindrical side surface of chamber 48 of the float 14 serve to minimize friction of the float travelling along the guide tube 10. See Figs. 3 and 4.

Permanent horseshoe magnet 52 is slightly smaller in diameter than chamber 48, on the top of which it rests and is secured. The magnet 52 has a pair of opposed north and south poles terminating in concave pole surfaces or faces, the radius of curvature of which is slightly greater than that of the outer surface of the inner housing tube 12. Therefore, the pole faces are positioned closely adjacent to and on opposite sides of housing tube 12 and armature 38 contained therein.

The roller balls 51 are provided in sets of two, as seen in Fig. 4, which are arranged along an element of the outer cylinder of chamber 48. Circumferentially, as seen in Fig. 3, the sets of roller balls 51 are spaced apart approximately 120°, and in any event there are at least three sets of balls 51 arranged to encompass more than half the circle of the cylinder 10. Each set of balls 51 rolls in a path along an element of the cylinder of guide tube 10, which accordingly constitutes a raceway or guideway for its corresponding set of balls 51.

Bearing engagement of each raceway of guide tube 10 against its corresponding set of bearing balls 51 opposes bearing engagement of the other raceways, and holds chamber 48, and the float 14 thereof, located concentrically with reference to guide tube 10, thereby holding the pole pieces of magnet 52 properly located with reference to housing tube 12 and armature 38 contained therein. During travel of the float 14, vertically along guide tube 10 to follow the water level or cleavage line in accordance with depth changes of the liquid in container "T," the float, including the chamber 48 and the magnet 52, is held out of physical contact with tube 12, avoiding frictional drag that would effect the accuracy of depth determinations. Magnetic force between the poles of magnet 52 and armature 38, together with the confining bearing contact of the several sets of rollers 51, maintains uniform magnetic attraction of armature 38 to magnet 52 during travel of the magnet along the housing tube 12.

Therefore, the position of bus bar 44 along the resistance wires 32 is an accurate gage of the depth of liquid in container "T," and the magnitude of resistance in the circuit of resistance wires 32 affords an accurate measurement of the quantity fuel in the tank "T."

The upper ends of resistance wires 32 are connected, as by wires 56 and 58, to a Wheatstone bridge circuit 60 to form one branch thereof. The opposite branch comprises a variable resistor 62. The bridge circuit is completed by a pair of fixed resistors 64 and 66 comprising the other pair of opposed branches.

The junction point of resistor 64 and wire 56, and the junction point of variable resistor 62 and fixed resistor 66, are energized through conductors 68 and 70, respectively, by a source of D. C. voltage 72. The voltage supply of 72 preferably is derived from a voltage-regulated power supply to eliminate the possibility of error in measurement caused by voltage fluctuation. The junction point of fixed resistor 64 and fixed resistor 62, and the junction point of variable resistor 66 and wire 58, are connected by wires 74 and 76, respectively, to a curent-measuring device 78, which can be calibrated in gallons, depth or tons of buoyancy, as desired.

Operation

Oil, water or other ballast poured into chamber 48 of float 14 through the opening of plug or cap 54 until the buoyancy of the float 14 is such that it locates bus bar 44 in position along resistance wires 32 at the surface level of the tank liquid or the level of cleavage of two non-miscible liquids, as indicated by the arrow in Fig. 4. The traveller or armature member 16 is held in horizontal alignment with the magnet 52 by reason of the magnetic field between the pole face applying magnetic force to armature 38. As the liquid in tank "T" rises or falls, armature 38 follows the float 14 as it moves up and down within guide tube 10 and along housing tube 12 in accordance with changes in the level of liquid in container "T", and bus bar 44 thereby is actuated to slide along the resistance wires 32. Bus bar 44 is held to the level of the liquid in the tank "T", and the electrical value of the branch of the Wheatstone bridge that includes resistance wires 32, shunted by bus bar 44, is always proportional to the level of liquid in the tank. The indicating needle of the current measuring device 78 therefore shows a deflection proportional to the height of liquid in the tank. The indicator is calibrated by adjusting the variable resistance 62 so that the current-measuring device 78 reads zero when the tank is empty.

Alternately, the bridge circuit electrical signal can be used to operate pump motors, motor valves, alarms, and the like, as will be apparent to those skilled in the art.

The disclosed structure presents one practical embodiment of the invention.

I claim:

1. In a liquid-level indicating apparatus, a first elongated cylindrical tube positioned upright with its lower end submmerged in the liquid to be measured, a second elongated cylindrical tube of smaller diameter than that of the first tube and disposed upright within the first tube in fixed position with reference thereto, the first and second tubes being substantially co-extensive, a horseshoe magnet positioned within the first tube with its pole faces closely adjacent to the outer surface of the second tube on respective opposite sides thereof, a float within the first tube, the magnet being secured fixedly to the float to be buoyed to the surface of the liquid to be measured, a pair of resistance wires extending lengthwise inside the second tube substantially coextensive therewith and insulated therefrom, a cylindrical armature in the second tube and held at the level of the pole faces by the attraction of the magnet, the armature being provided with a pair of apertures companion to the pair of resistance wires for passage thereof, a bus bar secured fixedly to the armature and positioned to slide along the pair of resistance wires in circuit-closing contact therewith, and an electrical measuring device connected across the ends of the pair of resistance wires and operative to measure the resistance of those portions of the several wires of the pair within the circuit of the bus bar, as determined by the position of the float to indicate the surface level of the liquid to be measured.

2. In a liquid-level indicating apparatus, a first elongated cylindrical tube positioned upright with its lower end submerged in the liquid to be measured, a second elongated cylindrical tube of smaller diameter than that of the first tube and disposed upright within the first tube in fixed position with reference thereto, the first and second tubes being substantially co-extensive, a horseshoe magnet positioned within the first tube with its pole faces closely adjacent to the outer surface of the second tube on respective opposite sides thereof, a float within the first tube, the magnet being secured fixedly to the float to be buoyed to the surface of the liquid to be measured, a follower in the second tube and held at the level of the pole faces by the attraction of the magnet, and means responsive to the position of said follower for remotely indicating said position.

3. Apparatus as defined in claim 2 wherein said first elongated cylindrical tube has an opening in its lower submerged end for admitting the liquid to be measured, whereby to reduce the effect of turbulence and surges of the liquid in the tank upon the liquid in said first tube.

4. Apparatus as defined in claim 2 wherein said float comprises means engaging the inner surface of said first tube for guiding said float in its movement.

References Cited in the file of this patent

UNITED STATES PATENTS

| 1,363,139 | Mason | Dec. 21, 1920 |
| 1,610,591 | Redman | Dec. 14, 1926 |
| 1,652,377 | Sartakoff | Dec. 13, 1927 |
| 2,371,511 | Faus | Mar. 13, 1945 |
| 2,556,346 | Stromberg | June 21, 1951 |
| 2,592,929 | Matchett | Apr. 15, 1952 |
| 2,620,661 | Roux | Dec. 9, 1952 |
| 2,685,797 | Morschel | Aug. 10, 1954 |

FOREIGN PATENTS

| 600,546 | France | Nov. 10, 1925 |